United States Patent
Wang et al.

(10) Patent No.: US 10,983,978 B2
(45) Date of Patent: Apr. 20, 2021

(54) METHOD FOR UPDATING RELATIONAL INDEX, STORAGE MEDIUM AND ELECTRONIC DEVICE

(71) Applicant: BEIJING BAIDU NETCOM SCIENCE AND TECHNOLOGY CO., LTD., Beijing (CN)

(72) Inventors: Yang Wang, Beijing (CN); Xi Chen, Beijing (CN); Pengcheng Yuan, Beijing (CN); Xunchao Song, Beijing (CN); Xiaobo Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 136 days.

(21) Appl. No.: 16/161,968

(22) Filed: Oct. 16, 2018

(65) Prior Publication Data

US 2019/0205439 A1 Jul. 4, 2019

(30) Foreign Application Priority Data

Dec. 30, 2017 (CN) .......................... 201711485770.X

(51) Int. Cl.
*G06F 17/00* (2019.01)
*G06F 7/00* (2006.01)
*G06F 16/22* (2019.01)
*G06F 3/06* (2006.01)
*G06F 16/28* (2019.01)

(52) U.S. Cl.
CPC ........ *G06F 16/2272* (2019.01); *G06F 3/0604* (2013.01); *G06F 3/0644* (2013.01); *G06F 3/0674* (2013.01); *G06F 16/284* (2019.01)

(58) Field of Classification Search
CPC .. G06F 16/2272; G06F 16/284; G06F 3/0604; G06F 3/0644; G06F 3/0674
USPC ............................................................ 707/736
See application file for complete search history.

(56) References Cited

U.S. PATENT DOCUMENTS

| | | | | |
|---|---|---|---|---|
| 6,182,253 | B1 * | 1/2001 | Lawrence | G11C 29/50 365/201 |
| 6,212,628 | B1 * | 4/2001 | Abercrombie | G06F 9/30014 712/16 |
| 6,304,867 | B1 * | 10/2001 | Schmidt | G06F 16/284 707/999.003 |
| 6,378,035 | B1 * | 4/2002 | Parry | G11B 20/10 375/E7.025 |
| 6,742,026 | B1 * | 5/2004 | Kraenzel | H04L 67/34 709/203 |
| 7,929,534 | B2 * | 4/2011 | Poletto | H04L 43/0811 370/392 |
| 8,001,462 | B1 * | 8/2011 | Kupke | G06F 16/951 715/229 |
| 9,715,497 | B1 * | 7/2017 | Bhadbhade | G06F 40/284 |
| 10,628,771 | B1 * | 4/2020 | Sicilia | G06Q 10/06393 |

(Continued)

*Primary Examiner* — Pavan Mamillapalli
(74) *Attorney, Agent, or Firm* — Lathrop GPM LLP

(57) ABSTRACT

The present disclosure provides a method for updating a relational index, a storage medium and an electronic device. The method includes: reading out relational data of an entity to be operated from a disk to a memory; performing an updating operation on the relational data in the memory; storing the updated relational data into a memory relational index; writing content data of the entity to be operated into the disk; and synchronizing periodically the memory relational index to a disk relational index.

12 Claims, 5 Drawing Sheets

(56) References Cited

U.S. PATENT DOCUMENTS

| | | | | |
|---|---|---|---|---|
| 2002/0174138 A1* | 11/2002 | Nakamura | ............ | G06F 16/284 |
| | | | | 707/999.2 |
| 2006/0132822 A1* | 6/2006 | Walmsley | ................ | G06F 21/57 |
| | | | | 358/1.14 |
| 2006/0294197 A1* | 12/2006 | Mital | ..................... | G06Q 10/06 |
| | | | | 709/217 |
| 2009/0313278 A1* | 12/2009 | DeWoolfson | ......... | G06F 16/289 |
| | | | | 707/999.103 |
| 2010/0174720 A1* | 7/2010 | Mack | ...................... | G06F 16/22 |
| | | | | 707/741 |
| 2010/0287014 A1* | 11/2010 | Gaulin | .................... | G06F 16/93 |
| | | | | 705/342 |
| 2012/0330964 A1* | 12/2012 | Baude | ................. | G06F 16/2272 |
| | | | | 707/741 |
| 2019/0042641 A1* | 2/2019 | Aylett | ................... | G06F 16/288 |

\* cited by examiner

METHOD FOR UPDATING RELATIONAL INDEX, STORAGE MEDIUM AND ELECTRONIC DEVICE

CROSS-REFERENCE TO RELATED APPLICATIONS

This application is based on and claims priority of Chinese Patent Application No. 201711485770.X, filed on Dec. 30, 2017, the entire contents of which are incorporated herein by reference.

FIELD

The present disclosure relates to a field of information processing technology, and more particularly to, a method for updating a relational index, a storage medium, and an electronic device.

BACKGROUND

When performing search using a search engine, query information is inputted, such that the search engine identifies entities according to the query information and determines a target entity based on relations between entities. Existing procedures require read out of all involved entities and relations between the entities from a disk to a memory, which affects the efficiency of search. In addition, when relations between the entities change, a lockmode is set for each involved entity, such that a large number of disk reading and writing operations can be generated, thus increasing a possibility of thread block and decreasing performance.

SUMMARY

The present disclosure provides a method for updating a relational index, a storage medium and an electronic device.

An embodiment of the present disclosure provides a method for updating a relational index. The method includes: reading out relational data of an entity to be operated from a disk to a memory; performing an updating operation on the relational data in the memory; storing updated relational data in a memory relational index; writing content data of the entity to be operated into the disk; and synchronizing periodically the memory relational index to a disk relational index.

Another embodiment of the present disclosure provides an apparatus for updating a relational index. The apparatus includes: a reading module, configured to read out relational data of an entity to be operated from a disk to a memory; an updating module, configured to perform an updating operation on the relational data in the memory; a storing module, configured to store updated relational data in a memory relational index; a writing module, configured to write content data of the entity to be operated into the disk; and a synchronizing module, configured to synchronize periodically the memory relational index to a disk relational index.

Another embodiment of the present disclosure provides a non-transitory computer readable storage medium having computer programs stored thereon. When the computer programs are executed by a processor, the processor is caused to execute a method for updating a relational index according to embodiments of the present disclosure.

Another embodiment of the present disclosure provides an electronic device, including a processor, a memory and computer programs stored in the memory and executable by a processor, the processor is configured to perform a method for updating a relational index according to embodiments of the present disclosure.

The partial accompanying aspects and advantages of the present disclosure will be illustrated in the following description, which will be apparently, or be understood by the practice of the present disclosure in the following description.

BRIEF DESCRIPTION OF THE DRAWINGS

The above and/or accompanying aspects and advantages in the present disclosure will be more clearly and easy to understand with reference to the following of the embodiments described the accompanying drawings, in which.

DETAILED DESCRIPTION

Reference will be made in details below to embodiments of the present disclosure, examples of which are illustrated in the accompanying drawings. The same or similar numbers represent the same or similar elements or elements with the same or similar function. Embodiments described below in the following accompanying drawings are exemplary, only for purpose of description of the present disclosure, but not constructed to limit the present disclosure.

A method for updating a relational index, an apparatus for updating a relational index, and an electronic device according to embodiments of the present disclosure will be described with reference to accompanying drawings.

Figure 1:
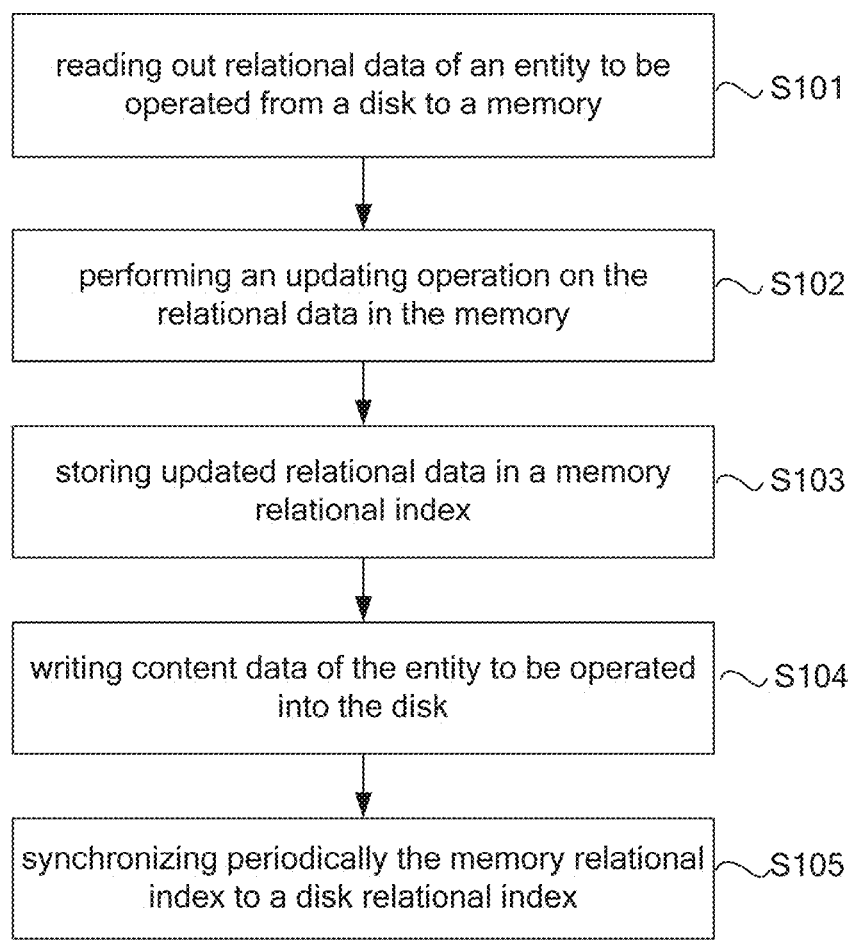
FIG. 1 is a flow chart illustrating a method for updating a relational index according to an embodiment of the present disclosure.

FIG. 1 is a flow chart illustrating a method for updating a relational index according to an embodiment of the present disclosure.

As illustrated in FIG. 1, the method includes embodiment described below.

At block S101, relational data of an entity to be operated is read out from a disk to a memory.

At present, when performing search, typically, data stored in a database is read out from the disk to the memory and then operations are performed. The database generally stores entity information and relations between entities. The entity may be a vertex, a relation between entities may be an edge, such that an entity relation diagram can be generated. During the search, it is required to read out all involved entities and relations between entities from the disk to the memory and to perform corresponding operations, such that an efficiency of search may be affected. For example, when query information is the daughter of Andy Lau's wife, starting from an entity "Andy Lau", an entity "Carol" can be found through an edge "wife" of the entity "Andy Lau", and an entity "Hanna Lau" can be found through an edge "daughter" of the entity "Carol". In the whole process, the entity "Carol" is unnecessary, but only the relation of "daughter" of the entity "Carol" is required. In the related art, since a relation of an entity is bound to the entity, it is required to read out the entity "Carol" from the disk to the memory, such that unnecessary operations are caused, thus affecting search efficiency.

Figure 2:
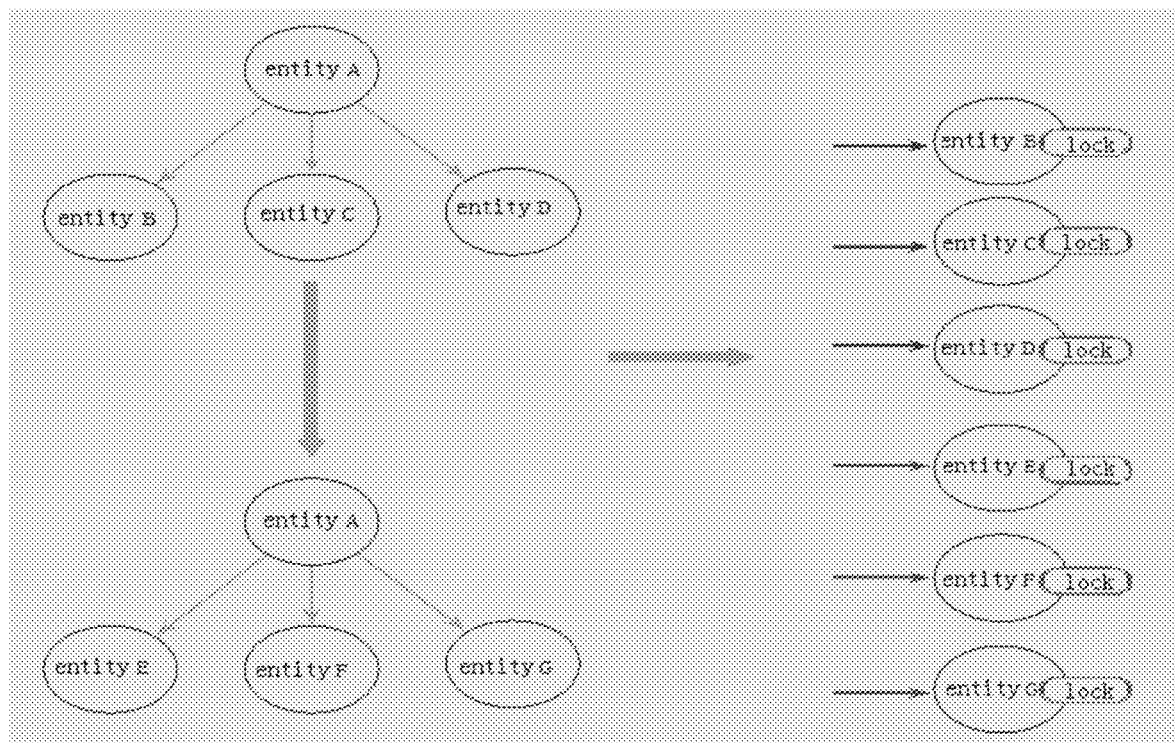
FIG. 2 is a schematic diagram illustrating an updating operation of an entity relation in the related art.

In addition, when relations between entities change, a lockmode is set for each involved entity, such that a large number of reading and writing operations are generated, thus increasing a possibility of thread block and decreasing performance. As illustrated in FIG. 2, entity A has three edges, directed to entity B, entity C and entity D respectively. When outgoing edges of entity A direct respectively to entity E, entity F and entity it is required to read out all entities from the disk to the memory. Meanwhile, the lockmode is set for each of the entities, and the incoming edge directing to entity A can be removed for entity B, entity C and entity D, and the incoming edge directing to entity A can be added for entity E, entity F and entity G When the relations between those entities are updated, those entities need to be converted into j son character strings, which involves a large number of reading and writing operations and decreases performance.

The reason for decreasing the performance is that, due to the coupling of the relational index and the entity, it is required to read out content of all involved entities to acquire relations between entities and a lockmode is set for each entity during the procedure. Accordingly, the present disclosure provides a method for updating a relational index, which may decouple the entity and the relation to improve performance.

In an embodiment of the present disclosure, the relational data of the entity to be operated is read out from the disk to the memory.

At block S102, in the memory, an updating operation is performed on the relational data.

Figure 3:
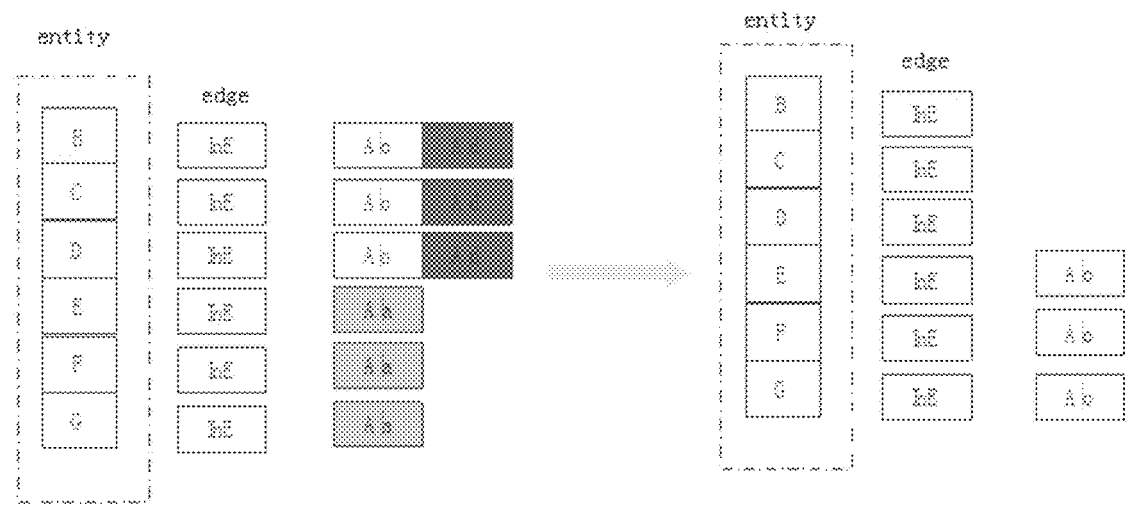
FIG. 3 is a schematic diagram illustrating an updating operation of an entity relation according to an embodiment of the present disclosure.

The updating operation on the relational data actually includes an addition operation and a deletion operation. As illustrated in FIG. 3, the updating operation for entity B, entity C, entity D refers to deleting incoming edge (InE) directing to entity A. The updating operation for entity E, entity F and entity G refers to adding incoming edge directing to entity A. A|a represents adding an edge directing to A, A|d represents deleting an edge directing to A, and A|o represents remaining original value.

At block S103, the updated relational data is stored in a memory relational index.

After updating operation on the relational data, the updating operation on the relational data is added to the memory relational index. For example, the adding of the updating operation is only applied to the relational indexes of entity B, entity C, entity D, entity E, entity F and entity which takes a short time for lockmode and barely affects the performance throughput, without a large number of disk writing and reading. Since all operations are performed in the memory, the efficiency may be improved greatly.

At block S104, content data of the entity to be operated is written into the disk.

Figure 4:
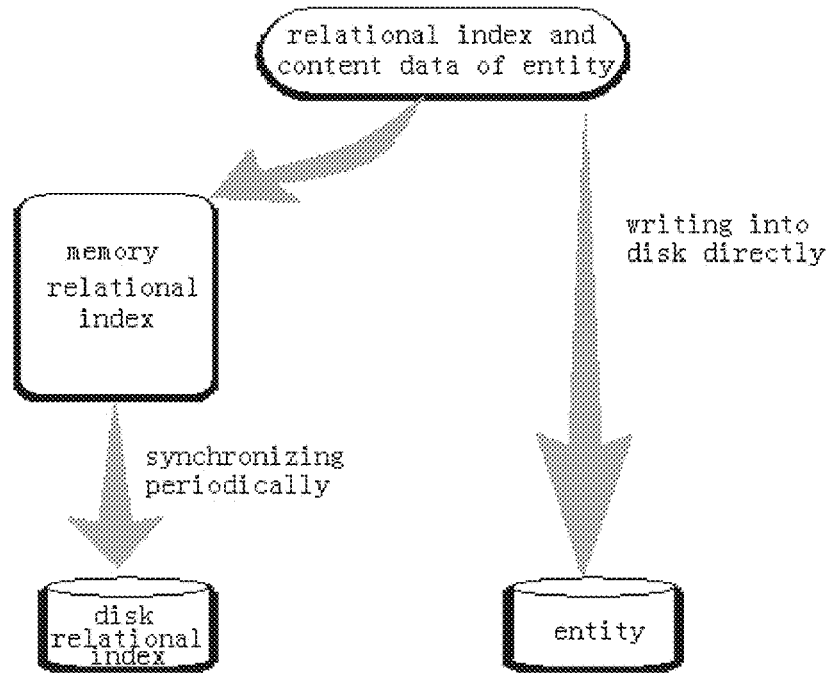
FIG. 4 is a schematic diagram illustrating an effect of separately maintaining a relational index and content data of an entity according to an embodiment of the present disclosure.

As illustrated in FIG. 4, through block S103-S104, the relational index and the content data of the entity can be divided and maintained separately, such that the decoupling can be realized.

At block S105, the memory relational index is synchronized periodically to a disk relational index.

Figure 5:
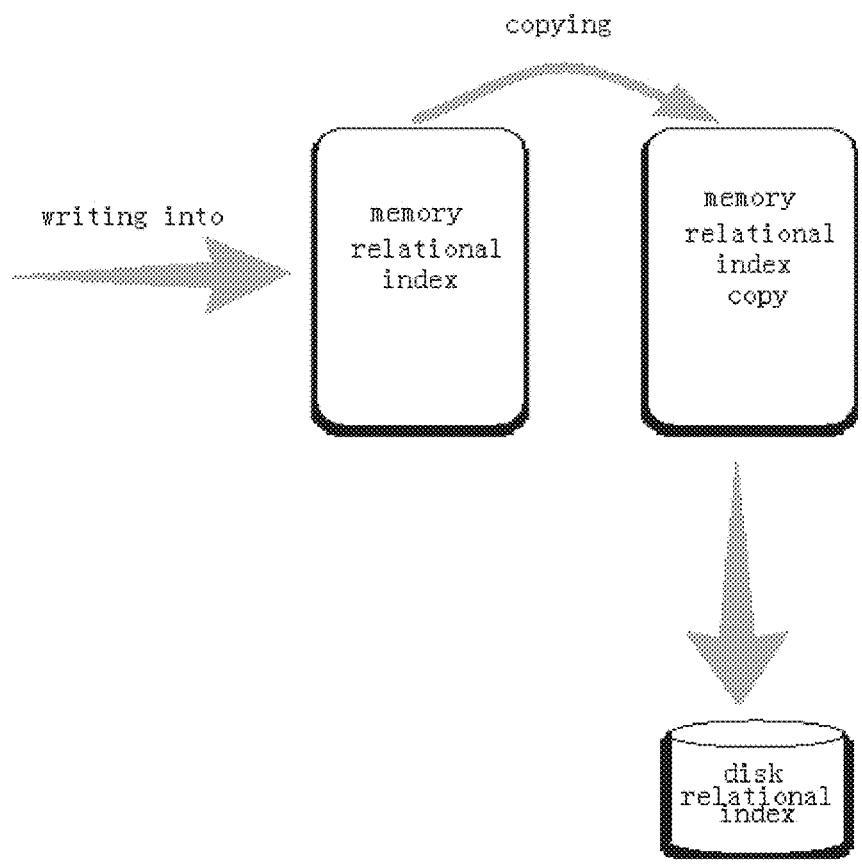
FIG. 5 is a schematic diagram illustrating a relational index synchronization according to an embodiment of the present disclosure.

In detail, as illustrated in FIG. 5, the memory relational index is merged to the disk relational index using a double buffering technique.

It should be understood that, each of the memory relational index and the disk relational index is a single-entity granularity index.

The disk stores relational indexes of all entities, and a format of each relational index is a two-dimensional array. A format of each entity in the relational index is a 64-bit integer.

With the above updating method, the synchronization updating of relations is changed to the asynchronization updating of relations, such that an accuracy of edge relations can be ensured when performing search.

The two-dimensional array is described simply below.

Each entity has an id which is defined as a 64-bit integer. As shown in table 1, the field id is divided into Shardid, Logicid, Pardid and Internalid, which are 64 bits in total.

TABLE 1

| Shardid (16-bit) | Logicid (16-bit) | Partid (8-bit) | Internalid (24-bit) |
|---|---|---|---|

Shardid, id of a sheet. For a diagraph index (entity and relation between entities forming entity relation diagram), if a single machine cannot accommodate the diagraph index, the diagraph index is divided into N blocks and distributed to N machines. Each sheet is also known as shard. Each shard has one id, configured to indicate the shard to which a current entity belongs.

Logicid, a single diagraph retrieving system may have a plurality of bases, for example, like mysql, there may be a plurality of bases in mysql, where each base has a plurality of tables. In the diagram retrieving system, each base is referred to as a logical base, the bases are independent from each other. An ID of the logical base in the entity is logicid, configured to indicate the logical base to which the entity belongs.

Pardid involves a storage structure of diagraph indexes. A diagraph index of each base is not a single disk document, but is divided into N disk documents, such that a plurality of threads can be used to launch a base, thus increasing the launching speed. Each pard has an id, configured to indicate the disk document to which the entity belongs.

Internalid, when pardid indicates the disk document to which the entity belongs, configured to indicate an offset of the entity in the document.

In summary, when the id of entity is a 64-bit integer, the logical base catalog of the entity can be located quickly from the disk, and the disk document of the entity and the offset of the entity in the document can be determined quickly. Since the two-dimensional array is defined above special for diagraph search, the diagraph can be obtained quicker than a conventional merging-tree-based acquisition method, such as leveldb, rocksdb.

The above operation on entity refers to a single entity of the disk. When the requirement on search performance is high, it is difficult to satisfy the requirement of disk search. It is required to store all entities in the memory in a form of two-dimensional array. How to quickly acquire the entity can be realized by a combination of partid and internalid.

Figure 6:
FIG. 6 is a schematic diagram illustrating an effect of a big number according to an embodiment of the present disclosure.
Figure 7:
FIG. 7 is a schematic diagram illustrating an effect of a small number according to an embodiment of the present disclosure.

Since Partid is random, each bit of partid has a corresponding value. However, internalid is increased from small to big, as illustrated in FIG. 6, in a big number, the part with darker color refers to that the part is occupied. The entire 32-bit id can be used to represent the Partid and the internalid, such that the data amount representing the entire 32-bit is large. However, since internalid is increased from small to big, and the number of single machine entities in the practical application is limited, which is about tens of millions at present and much smaller than a representation range of internalid, there may be a large space not occupied in the middle, such that a big number can be changed to a small number. As illustrated in FIG. 7, the space not occupied is placed before partid, to form a small number. In this way, when performing search with Entity_list[parid+internalid], the computation can be reduced. However, it is difficult to estimate a maximum value of parid+internalid, such that a size of entity_list can not be estimated.

Figure 8:
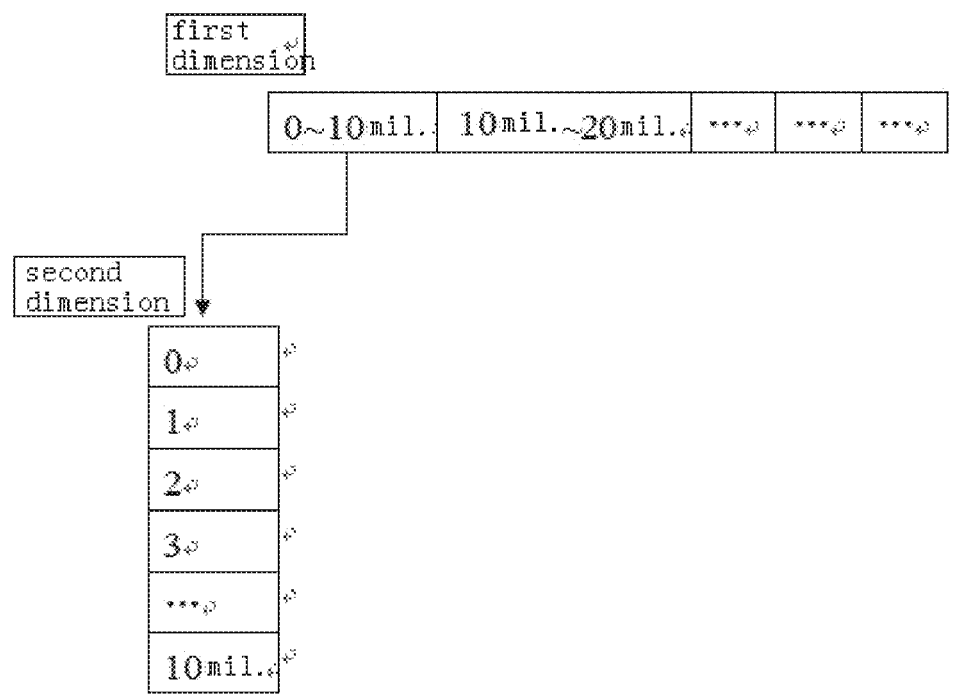
FIG. 8 is a schematic diagram illustrating a two-dimensional array according to an embodiment of the present disclosure.

Accordingly, a two-dimensional array is introduced in this embodiment. As illustrated in FIG. 8, the first dimension defines a range of the second dimension id. In the first dimension, a position indicated by 0 directs to an id in a range of 0-10 million. The second dimension represents an entity_list[id(0-10 million)]. Since the big number is transformed to a small number, the second dimension increases in sequence, such that wasted space can be controlled. For example, if there is 6 million of data, 4 million of array space is wasted in the second dimension. The first dimension is represented by a vector of a standard base, such that no other space is wasted besides the controllable wasted space in the second dimension.

Finally, the usage of space in the two dimensional array is: Entity_list[max(used id)]+entity_list[unoccupied array space in the two dimensional array]+one vector=entity data*1.2~1.5. Compared with Entity_id[full of 32 bits=42 hundred millions]=cannot be realized due to too large of data amount, or Map/hash=entity data*2~5 in the related art, not only the efficiency of accessing the array with the present method is improved, but also high-effective usage of space is satisfied.

Further, when performing search with the relational index, merely the relational index is required to load to the memory without loading the content data of the entity. Since data amount of the relational index is small, all the relational indexes can be load to the memory, and only a filtering needs to be performed on edges (relation between entities), which can greatly increase the search efficiency. For example, when the query information is the daughter of Andy Lau's wife, starting from an entity "Andy Lau", an entity "Hanna Lau" can be found through an edge "wife" and an edge "daughter". During this procedure, it is unnecessary to read out content data of entity "Carol" but only need to know the relation between "Carol" and "Hanna Lau" is mother-daughter relation.

With the method according to embodiments of the present disclosure, by reading out the relational data of the entity to be operated from the disk to the memory, performing an updating operation on the relational data in the memory, storing the updated relational data in the memory relational index, writing content data of the entity to be operated into the disk and synchronizing periodically the memory relational index to a disk relational index, decoupling of the entity and the relation can be realized without reading out data of all entities, thus improving performance.

Figure 9:
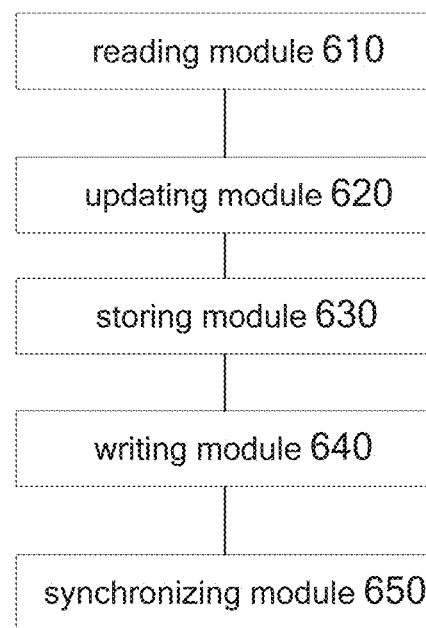
FIG. 9 is a block diagram illustrating an apparatus for updating a relational index according to an embodiment of the present disclosure.

In order to implement the above embodiments, the present disclosure further provides an apparatus for updating a relational index. FIG. 9 is a block diagram of an apparatus for updating a relational index according to an embodiment of the present disclosure. As illustrated in FIG. 9, the apparatus includes a reading module 610, an updating module 620, a storing module 630, a writing module 640 and a synchronizing module 650.

The reading module 610 is configured to read out relational data of an entity to be operated from a disk to a memory.

The updating module 620 is configured to perform an updating operation on the relational data in the memory.

The storing module 630 is configured to store updated relational data in a memory relational index.

The writing module 640 is configured to write content data of the entity to be operated into the disk.

The synchronizing module 650 is configured to synchronize periodically the memory relational index to a disk relational index.

It should be noted that, the description of the method for updating the relational index according to embodiments of the present disclosure is also appropriate to the apparatus for updating the relational index according to embodiments of the present disclosure. Details of the apparatus embodiments are not elaborated here.

With the apparatus according to embodiments of the present disclosure, by reading out the relational data of the entity to be operated from the disk to the memory, performing an updating operation on the relational data in the memory, storing the updated relational data in the memory relational index, writing content data of the entity to be operated into the disk and synchronizing periodically the memory relational index to a disk relational index, decoupling of the entity and the relation can be realized without reading out data of all entities, thus improving performance.

In order to implement the above embodiments, the present disclosure further provides a computer-readable storage medium, stored thereon computer programs that, when executed by a processor, realize the method described above.

In order to implement the above embodiments, the present disclosure further provides an electronic device including a processor, a storage and an computer program stored on the storage and executable by the processor. The processor is caused to perform the method described above.

For example, the computer program can be executed by the processor, to perform the following.

At block S101', relational data of an entity to be operated is read out from a disk to a memory.

At block S102', in the memory, an updating operation is performed on the relational data.

At block S103', the updated relational data is stored in a memory relational index.

At block S104', content data of the entity to be operated is written into the disk.

At block S105', the memory relational index is synchronized periodically to a disk relational index.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

It is to be noted that, in the description of the present disclosure, the terms such as "first" and "second" are used herein for purposes of description and are not intended to indicate or imply relative importance or significance. Furthermore, "a plurality of" means two or more than two, unless specified otherwise.

Any process or method described in the flow chart or with other ways may be understood that, it represents including one or more modules, segments or portions of code configured to implement executive instructions of the steps of a particular logical function or process. And the scope of preferred embodiments of the present disclosure includes additional implementations, in which, it may not be in the order shown or discussed, including an order of a substantially simultaneous way or a converse way based on the functions involved, to execute the functions. This may be understood by the skilled in the art embodiments of the present disclosure belong to.

It should be understood that, each part of the present disclosure may be implemented with hardware, software, firmware or a combination thereof. In the above implementation, a plurality of operations or methods may be implemented with the software or the firmware which is stored in the memory and is executed by a suitable instruction execution system. For example, if the hardware is used to implement, as in another implementation, it may be implemented by any of the following technologies known in the present disclosure or combinations thereof: with configured to realize discrete logic circuits of logic gate circuits of logic function for a data signal, with a suitable application specific integrated circuit of a combinatorial logical gate circuit, a Programmable Gate Array (PGA), a Field Programmable Gate Array (FPGA) and the like.

The skilled in the art may understand that all or part of steps carried by the method of the above embodiments may be implemented by a program to instruct related hardware. The programs may be stored in a computer readable storage medium, when is executed, including one of steps of method embodiments or combinations thereof.

In addition, respective function module in respective embodiment of the present disclosure may be integrated in one processing module, and further may be that each unit physically exists separately, and further may be that two or more units are integrated in one module. The above integrate module may be implemented in the form of hardware, and further in the form of the software function module. When the integrate module is implemented in the form of the software function module and is sold or used as an independent product, it may be stored in a computer readable storage medium.

The above-mentioned storage medium may be a ROM (Read Only Memory), a magnetic disk or a CD (Compact Disk) and the like. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for updating a relational index, comprising:
   reading out relational data of an entity to be operated from a disk to a memory, wherein the relational data indicates a relationship between the entity to be operated and another entity, the relationship between the entity and another entity can be obtained by reading out only the relational data without reading out content data of the entity;
   performing an updating operation on the relational data in the memory;
   storing updated relational data in a memory relational index;
   writing the content data of the entity to be operated into the disk; and
   synchronizing periodically the memory relational index to a disk relational index;
   wherein the disk stores relational indexes of all entities, and a format of each relational index is a 64-bit integer, and the last 32 bits of the 64-bit integer are represented by a two-dimensional array.

2. The method according to claim 1, wherein synchronizing periodically the memory relational index to the disk relational index comprises:
   merging the memory relational index into the disk relational index using a double buffering technique.

3. The method according to claim 1, wherein each of the memory relational index and the disk relational index is a single-entity granularity index.

4. The method according to claim 1, wherein storing the updated relational data in the memory relational index comprises:
   adding the updating operation on the relational data to the memory relational index.

5. A non-transitory computer-readable storage medium, stored thereon computer programs that, when executed by a processor, realize the method for updating a relational index, comprising:
   reading out relational data of an entity to be operated from a disk to a memory, wherein the relational data indicates a relationship between the entity to be operated and another entity, the relationship between the entity and another entity can be obtained by reading out only the relational data without reading out content data of the entity;
   performing an updating operation on the relational data in the memory;
   storing updated relational data in a memory relational index;
   writing the content data of the entity to be operated into the disk; and
   synchronizing periodically the memory relational index to a disk relational index;
   wherein the disk stores relational indexes of all entities, and a format of each relational index is a 64-bit integer, and the last 32 bits of the 64-bit integer are represented by a two-dimensional array.

6. The non-transitory computer-readable storage medium according to claim 5, wherein synchronizing periodically the memory relational index to the disk relational index comprises:
   merging the memory relational index into the disk relational index using a double buffering technique.

7. The non-transitory computer-readable storage medium according to claim 5, wherein each of the memory relational index and the disk relational index is a single-entity granularity index.

8. The non-transitory computer-readable storage medium according to claim 5, wherein storing the updated relational data in the memory relational index comprises:
   adding the updating operation on the relational data to the memory relational index.

9. An electronic device, comprising:
   a processor; and
   a memory, configured to store an instruction executable by the processor;
   wherein the processor is configured to execute the instruction to perform the method for updating a relational index, comprising:
   reading out relational data of an entity to be operated from a disk to a memory, wherein the relational data indicates a relationship between the entity to be operated and another entity, the relationship between the entity and another entity can be obtained by reading out only the relational data without reading out content data of the entity;
   performing an updating operation on the relational data in the memory;
   storing updated relational data in a memory relational index;
   writing the content data of the entity to be operated into the disk; and
   synchronizing periodically the memory relational index to a disk relational index;
   wherein the disk stores relational indexes of all entities, and a format of each relational index is a 64-bit integer, and the last 32 bits of the 64-bit integer are represented by a two-dimensional array.

10. The electronic device according to claim 9, wherein synchronizing periodically the memory relational index to the disk relational index comprises:
   merging the memory relational index into the disk relational index using a double buffering technique.

11. The electronic device according to claim 9, wherein each of the memory relational index and the disk relational index is a single-entity granularity index.

12. The electronic device according to claim 9, wherein storing the updated relational data in the memory relational index comprises:
   adding the updating operation on the relational data to the memory relational index.

* * * * *